(12) United States Patent
Keyes

(10) Patent No.: US 11,268,813 B2
(45) Date of Patent: Mar. 8, 2022

(54) INTEGRATED INERTIAL GRAVITATIONAL ANOMALY NAVIGATION SYSTEM

(71) Applicant: Honeywell International Inc., Morris Plains, NJ (US)

(72) Inventor: Sally Ann Keyes, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 144 days.

(21) Appl. No.: 16/845,987

(22) Filed: Apr. 10, 2020

(65) Prior Publication Data

US 2021/0215484 A1    Jul. 15, 2021

Related U.S. Application Data

(60) Provisional application No. 62/960,457, filed on Jan. 13, 2020.

(51) Int. Cl.
*G01C 21/16* (2006.01)
*G01C 5/06* (2006.01)
(Continued)

(52) U.S. Cl.
CPC ............. *G01C 21/165* (2013.01); *G01C 5/06* (2013.01); *G01C 21/28* (2013.01); *G01C 21/34* (2013.01);
(Continued)

(58) Field of Classification Search
CPC ........ G01C 21/165; G01C 5/06; G01C 21/28; G01C 21/34; G01C 25/005; G01V 7/04; G01V 7/16
See application file for complete search history.

(56) References Cited

U.S. PATENT DOCUMENTS 4,173,784 A * 11/1979 Heath ...................... G06G 7/78
244/177
5,272,639 A    12/1993 McGuffin
(Continued)

FOREIGN PATENT DOCUMENTS

CN    101769742 A    7/2010
CN    101424534 B    10/2011
(Continued)

OTHER PUBLICATIONS

European Patent Office, "Extended European Search Report from U.S. Appl. No. 16/845,987, filed May 11, 2021", from Foreign Counterpart to U.S. Appl. No. 16/845,987, filed May 11, 2021, pp. 1 through 10, Published: EP.
(Continued)

*Primary Examiner* — Luis A Martinez Borrero
(74) *Attorney, Agent, or Firm* — Fogg & Powers LLC

(57) ABSTRACT

A system implementing a method for generating a navigation output is provided. The method includes determining a gravitational anomaly estimate based at least in part on inertial sensor data and navigation output; generating navigation and sensor corrections that are due at least in part on inherent sensor errors that include vertical accelerometer/gravimeter corrections from at least a navigation output estimate, the gravitational anomaly estimate, and the gravity map data; and generating the navigation output based on the inertial sensor data, gravity map data and the navigation and sensor corrections.

20 Claims, 3 Drawing Sheets

(51) Int. Cl.
*G01C 21/28* (2006.01)
*G01C 21/34* (2006.01)
*G01C 25/00* (2006.01)
*G01V 7/04* (2006.01)
*G01V 7/16* (2006.01)

(52) U.S. Cl.
CPC ............ *G01C 25/005* (2013.01); *G01V 7/04* (2013.01); *G01V 7/16* (2013.01)

(56) References Cited

U.S. PATENT DOCUMENTS

| | | | | |
|---|---|---|---|---|
| 5,339,684 | A * | 8/1994 | Jircitano | G01C 21/16 |
| | | | | 701/504 |
| 5,359,889 | A | 11/1994 | Jircitano et al. | |
| 5,774,832 | A * | 6/1998 | Vanderwerf | G01C 21/16 |
| | | | | 701/504 |
| 5,912,643 | A * | 6/1999 | Chew | G01C 21/16 |
| | | | | 342/457 |
| 6,185,502 | B1 * | 2/2001 | Sumner | G01C 21/005 |
| | | | | 701/461 |
| 6,532,419 | B1 * | 3/2003 | Begin | G01C 21/28 |
| | | | | 701/504 |
| 6,618,683 | B1 * | 9/2003 | Berstis | G01C 21/165 |
| | | | | 340/10.1 |
| 7,940,210 | B2 | 5/2011 | Fly et al. | |
| 8,010,308 | B1 * | 8/2011 | Churchill | G01C 25/005 |
| | | | | 702/104 |
| 8,311,739 | B2 * | 11/2012 | Huddle | G01C 25/005 |
| | | | | 701/469 |
| 8,359,920 | B2 * | 1/2013 | Meyer | G01V 7/16 |
| | | | | 73/382 G |
| 8,375,785 | B2 * | 2/2013 | Metzger | G01V 7/00 |
| | | | | 73/382 G |
| 8,578,771 | B2 * | 11/2013 | Dosch | G01V 7/00 |
| | | | | 73/382 G |
| 9,068,843 | B1 * | 6/2015 | Sohn | G01C 21/18 |
| 9,423,318 | B2 | 8/2016 | Liu et al. | |
| 9,568,320 | B2 * | 2/2017 | Al-Rawashdeh | G01C 21/16 |
| 9,810,549 | B2 * | 11/2017 | Johnson | G01C 25/005 |
| 10,302,453 | B2 * | 5/2019 | Kotwal | G01C 25/005 |
| 11,015,957 | B2 * | 5/2021 | Wilkinson | G01C 23/00 |
| 11,150,093 | B1 * | 10/2021 | Kasevich | G01C 21/165 |
| 2009/0319228 | A1 * | 12/2009 | Niu | G01C 25/005 |
| | | | | 702/182 |
| 2012/0022784 | A1 * | 1/2012 | Louis | G01C 21/165 |
| | | | | 701/445 |
| 2012/0203455 | A1 * | 8/2012 | Louis | G01C 21/165 |
| | | | | 701/505 |
| 2012/0203519 | A1 * | 8/2012 | Louis | G01C 21/16 |
| | | | | 703/2 |
| 2013/0030700 | A1 * | 1/2013 | Miller | G08G 1/20 |
| | | | | 701/500 |
| 2013/0332064 | A1 * | 12/2013 | Funk | G01S 19/13 |
| | | | | 701/409 |
| 2016/0047675 | A1 * | 2/2016 | Tanenhaus | G01C 25/005 |
| | | | | 702/104 |
| 2017/0108612 | A1 * | 4/2017 | Aguib | G01V 7/06 |
| 2018/0128616 | A1 * | 5/2018 | Malvern | G01C 21/005 |
| 2018/0128645 | A1 | 5/2018 | Wilkinson | |
| 2019/0219733 | A1 | 7/2019 | Gabell | |
| 2020/0088521 | A1 * | 3/2020 | Glevarec | G01C 21/16 |

FOREIGN PATENT DOCUMENTS

| | | | | |
|---|---|---|---|---|
| CN | | 105157703 A | 12/2015 | |
| CN | | 108225310 A | 6/2018 | |
| CN | | 105716605 B | 7/2018 | |
| CN | | 108444479 A | 8/2018 | |
| CN | | 108871342 A | 11/2018 | |
| CN | | 108896040 A | 11/2018 | |
| CN | | 109141426 A | 1/2019 | |
| WO | WO-2019179882 A1 * | | 9/2019 | ........... G05B 13/045 |

OTHER PUBLICATIONS

Wikipedia, "Gravimetry", Jun. 23, 2019, pp. 1 through 3, Wikipedia.
Musso et al., "Terrain-aided navigation with an atomic gravimeter", Fusion 2019, Jul. 2019, pp. 1 through 9, Ottawa, Canada.
Wang et al., "A local geopotential model for implementation of underwater passive navigation", Progress in Natural Science 18, 2008, pp. 1139 through 1145, National Natural Science Foundation of China and Chinese Academy of Sciences, Published: Elsevier.
Wang et al., "Location Accuracy of INS/Gravity-Integrated Navigation System on the Basis of Ocean Experiment and Simulation", Sensors 2017, 17, 2961,, Dec. 20, 2017, pp. 1 through 13, MDPI, www.mdpi.com/journal/sensors.
Wang et al., "Measurements and Accuracy Evaluation of a Strapdown Marine Gravimeter Based on Inertial Navigation", Sensors 2018, 3902, Nov. 2, 2018, pp. 1 through 13, MDPI, www.mdpi.com/journal/sensors.
Wang et al., "Technology of gravity aided inertial navigation system and its trial in South China Sea", IET Radar Sonar Navigation, 2016, pp. 862 through 869, vol. 10, Issue 5, The Institution of Engineering and Technology.
Wu et al., "Performance Evaluation and Analysis for Gravity Matching Aided Navigation", Sensors 2017, 769, Apr. 5, 2017, pp. 1 through 15, MDPI, www.mdpi.com/journal/sensors.
Xiong et al., "An analysis of the effect of gravity anomaly to attitude estimation in high-precision GNSS/INS integrated navigation systems under overturning cases", Inertial Sensors and Systems, 2018, pp. 1 through 15, IEEE.
Jircitano et al., "Gravity Aided Inertial Navigation System (GAINS)", at least as early as Nov. 22, 2019, pp. 221-229.

* cited by examiner

INTEGRATED INERTIAL GRAVITATIONAL ANOMALY NAVIGATION SYSTEM

CROSS-REFERENCE TO RELATED APPLICATIONS

This application claims priority to U.S. Provisional Application Ser. No. 62/960,457, same title herewith, filed on Jan. 13, 2020, which is incorporated in its entirety herein by reference.

BACKGROUND

Navigating in global positioning system (GPS) denied environments is an important and challenging problem. Existing solutions have significant deficits. For example, inertial navigation systems (INS) solutions drift over time, vision-based solutions require visibility and visible features, celestial solutions require appropriate conditions for celestial observations, magnetic sensors are susceptible to interference, and terrain-based systems require variation in elevation.

Gravitational gradient and gravitational anomaly navigation systems also exist. However, drawbacks with current versions of these systems relate to the size, cost, and complexity of required sensors. Gravitational gradient navigation is challenging because of the size, weight, power, cost, and complexity associated with gradiometers (large devices that consist of multiple accelerometers and often have rotating components). Existing gravitational anomaly navigation suffers from similar challenges, as existing implementations use high performance gravimeters which are large, complex, and costly.

SUMMARY

The following summary is made by way of example and not by way of limitation. It is merely provided to aid the reader in understanding some of the aspects of the subject matter described. Embodiments provide a gravitational anomaly-aided navigation system.

In one embodiment, an integrated inertial and gravitational anomaly navigation system is provided. The system includes at least one inertial measurement unit (IMU), a gravity map, at least one memory, and at least one controller. The IMU includes an integrated gravimeter and is configured to output inertial sensor data. The gravity map includes gravitational forces that are associated with locations. The at least one memory is used to store operational instructions for at least functions. The at least one controller is in communication with an output of the at least one IMU and the at least one memory. The at least one controller is configured to execute the operating instructions stored in the at least one memory generating the functions. The functions including a strapdown navigation function, a measurement formation function and a fusion function. Wherein the strapdown navigation function generates a navigation output by the system based at least in part on the inertial sensor data, map data from the gravity map and navigation and sensor corrections from the fusion function. Further wherein the measurement formation function determines a gravitational anomaly estimate that is output to the fusion function based at least in part on the inertial sensor data and the navigation output. Further yet wherein the fusion function generates the navigation and sensor corrections due at least in part on inherent sensor errors that include vertical accelerometer/gravimeter errors from at least the navigation output, the gravitational anomaly estimate and the map data.

In another example embodiment, a method for generating a navigation output is provided. The method includes determining a gravitational anomaly estimate based at least in part on inertial sensor data and navigation output; generating navigation and sensor corrections that are due at least in part on inherent sensor errors that include vertical accelerometer/gravimeter errors from at least a navigation output estimate, the gravitational anomaly estimate, and the gravity map data; and generating the navigation output based on the inertial sensor data, gravity map data and the navigation and sensor corrections.

In yet another embodiment, another method for generating a navigation output is provided. The method including determining a gravitational anomaly estimate based at least in part on inertial sensor data, altitude and altitude derivative estimate sensor data, and navigation output; generating navigation and sensor corrections that are due at least in part on inherent sensor errors that include vertical accelerometer/gravimeter errors from at least a navigation output estimate, the gravitational anomaly estimate, altitude and altitude derivative sensor data and the gravity map data; and generating the navigation output based on the inertial sensor data, the gravity map data and the navigation and sensor corrections.

BRIEF DESCRIPTION OF THE DRAWINGS

Embodiments can be more easily understood and further advantages and uses thereof will be more readily apparent, when considered in view of the detailed description and the following figures in which.

DETAILED DESCRIPTION

Figure 1:
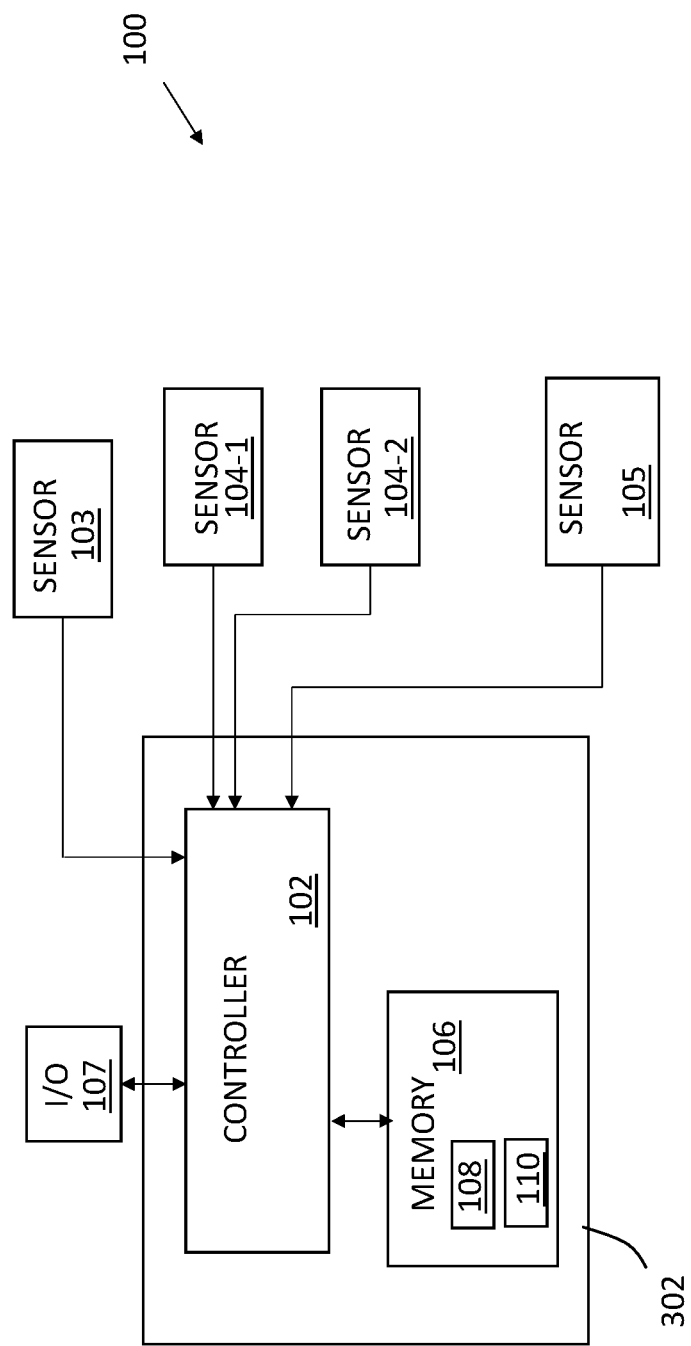
FIG. 1 is a block diagram of a navigational system according to one exemplary embodiment.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a gravitational anomaly-aided navigation system that may be of use for an aircraft, surface vehicles, sub-surface vehicles and the like. Embodiments include a strapdown or gimballed integrated inertial measurement unit (IMU) and a gravimeter. The use of an integrated IMU and gravimeter is achieved with the use of a vertical accelerometer in the IMU that is of sufficient quality to function as a gravimeter while also providing inertial navigation data required for the IMU function.

An additional vertical accelerometer may be incorporated to extend dynamic range or eliminate correlated errors in an embodiment. Embodiments may further include a map of gravitational anomalies and at least one navigation algorithm. The navigational algorithm may consist of an optimal filter or matching algorithm. The measured gravitational anomaly is used as an input to the algorithm, which estimates navigation/sensor/gravimeter errors. The IMU is an integral part of the navigation algorithms, and IMU errors are modeled and estimated in embodiments. The measured gravitational anomalies are obtained through corrections applied to a specific force. Corrections to the specific force may include, but are not limited to, second derivative of altitude, centripetal effect from velocity, Coriolis effect from velocity, altitude, attitude, and sensor errors.

To suit platform specific needs one or more altitude/depth sensors may be incorporated to provide altitude and altitude derivative data. These sensors may include, but are not limited to, barometric sensors, radar altimeters, laser altimeters, variometers, and depth sensors. A vertical accelerometer of varying quality may be used (including qualities below typical gravimeter grade), which is enabled through the navigation algorithms that provide error estimates of the sensor.

Initial calibration routines which may involve leveling, knowledge of position, GPS, specific maneuvers, or physically translating and/or rotating the system may be used to further enable the use of a vertical accelerometer with errors typically larger than most gravimeters in embodiments.

Advantages of embodiments include not having to rely on a gradiometer, using an input to the filter as a measurement/estimate of the gravitational anomaly rather than a height error, integrating an IMU into the system, accounting for IMU errors in the navigation algorithms, estimating the errors of the vertical accelerometer (therefore not being limited to the quality of gravimeter which has potential for higher navigation performance) and, integrating the gravimeter into the IMU as an accelerometer. Further, at least some of the embodiments do not need to include terrain or magnetic aiding sources, are not limited to use of a Kalman Filter for the navigation algorithm and use an estimate of gravimeter errors.

Referring to FIG. 1 a block diagram of a navigational system 100 of an example embodiment is illustrated. The navigational system 100 is illustrated as including a controller 102. The controller 102 controls operations of the navigational system 110. Further illustrated is a memory 106. The memory 106 in an embodiment includes instructions which are executed by the controller 102 to control operations of the navigational system 100.

In general, the controller 102 may include any one or more of a processor, microprocessor, a digital signal processor (DSP), an application specific integrated circuit (ASIC), a field program gate array (FPGA), or equivalent discrete or integrated logic circuitry. In some example embodiments, controller 102 may include multiple components, such as any combination of one or more microprocessors, one or more controllers, one or more DSPs, one or more ASICs, one or more FPGAs, as well as other discrete or integrated logic circuitry. The functions attributed to the controller 102 herein may be embodied as software, firmware, hardware or any combination thereof. The controller 102 may be part of a system controller or a component controller. The memory 106 may include computer-readable operating instructions that, when executed by the controller 102 provides functions of the navigation system 100. Such functions may include the functions used to provide a navigation signal as described below. The computer readable instructions may be encoded within the memory 106. Memory 106 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium. Further any software used may include program instructions that are stored (or otherwise embodied) on an appropriate non-transitory storage medium or media (memory 106) from which at least a portion of the program instructions can be read by the programmable processor (controller 102) for execution thereby.

The navigation system 100 further comprises at least one sensor, such as sensors 104-1, 104-2 and sensor 106. Sensors 104-1 through 104-2 may be inertial measurement units (IMUs) generally designated as 104. Embodiments may include additional sensors such as sensor 105. Sensor 105 may be a depth/altitude sensor 105 as discussed above. The depth/altitude sensor 105 may provide at least one of altitude and altitude derivative sensor data. Further an embodiment may also include at least one additional or supplemental vertical accelerometer 103 (than already in the IMUs 104) to at least one of extend dynamic range and eliminate correlated errors. Embodiments also include an input/output 109. The input/output 107 provides at least a communication path for operational data to be provided to the navigational system 100 as well as an output of the navigational system 100. The output 107 may include a vehicle control that is configured at least in part control navigation of an associated vehicle.

Embodiments employ a gravitational map 108, that in one embodiment, is stored in the at least one memory 106. Further included in the memory 106, in an example embodiment, are operational instructions 110 used to define functions which are further discussed below.

Figure 2:
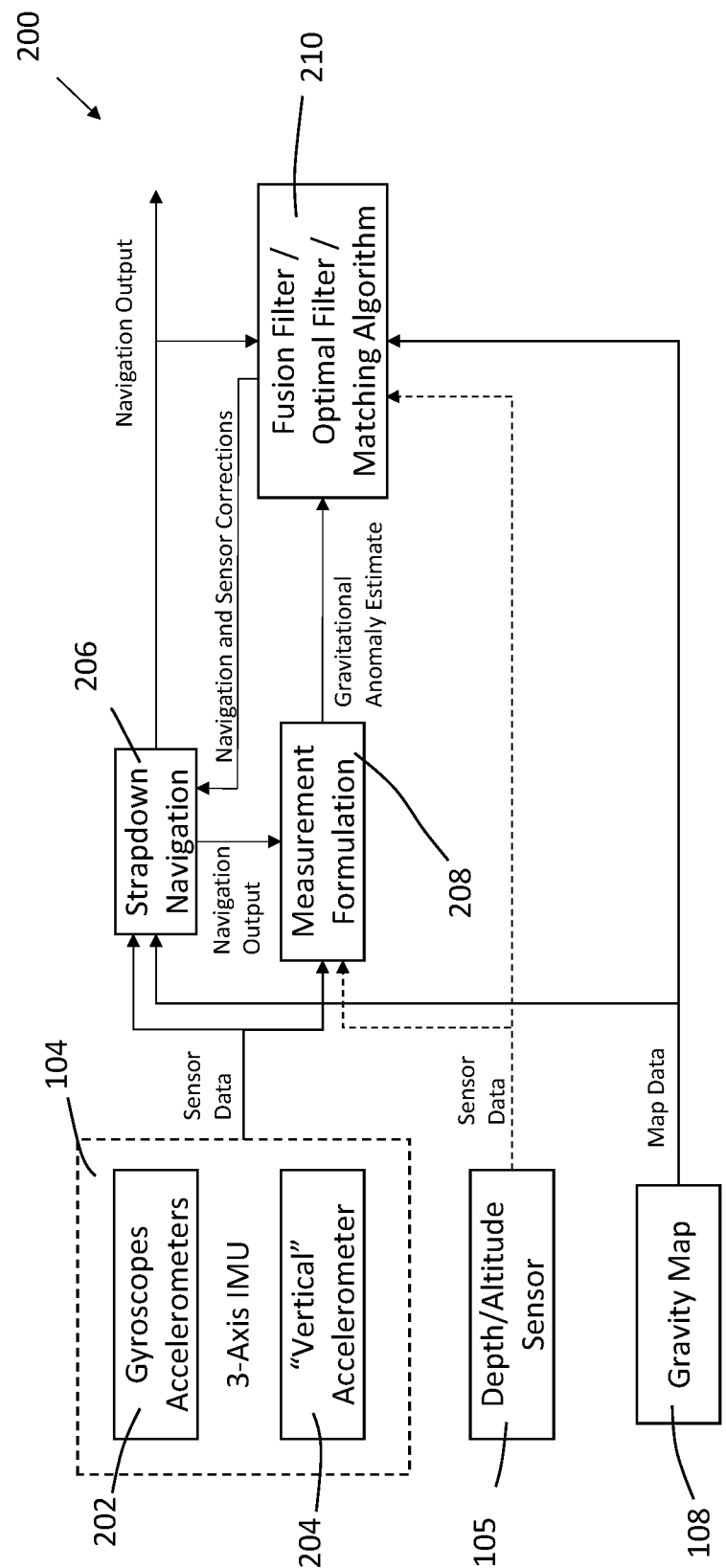
FIG. 2 is navigation data block diagram according to one exemplary embodiment.

Referring to FIG. 2, a first navigation data block diagram 200 of an example embodiment is illustrated. In this example, inertial sensor data is generated by at least one IMU 104. The IMU 104 in this example is a 3-axis IMU that includes a plurality of gyroscopes and accelerometers 202 as well as a gravimeter (vertical accelerometer 204 in this example embodiment). In this embodiment the vertical accelerometer is of sufficient quality to function as a gravity meter while also providing inertial navigation data as is required by the IMU. Sufficient quality may be determined by the variation (both in magnitude and rate) of the accelerometer bias and scale factor, as well as the white noise in the signal. Constant bias and scale factor errors may also determine whether the sensor is of sufficient quality, but this is not strictly necessary as initialization procedures, described above, can mitigate these error sources. The inertial sensor data from the IMU 104 is output to a strapdown navigation function block (206) and a measurement formulation function block (208).

The strapdown navigation function block (206) includes three inputs, one for the inertial sensor data from the IMU 104, another for map data from the gravity map 108 and one for navigation and sensor corrections from a fusion function block (210). The strapdown navigation function block (206) takes the inertial sensor data (angular rate and specific force measurements) from the IMU 104 and produces a navigation estimate (navigation output) which includes at least one of position, velocity and attitude estimates. Gravity force data from the gravity map 108 is used to provide an improved estimate of gravity, which is an important component to correctly process the specific force data from the accelerometers. The navigation and sensor error corrections are passed into strapdown navigation function block (206) from a fusion function block (210). The fusion function block (210) may be a fusion/optimal filter/matching algorithm function. The strapdown navigation function block (206), in an embodiment, uses algorithms that essentially integrate the inertial sensor data in an appropriate manner to produce the desired navigation parameters. The produced navigation parameters are susceptible to sensor errors and initial conditions errors. Because of this susceptibility, the navigation errors in the strapdown solution grow with time if they are not corrected with some type of filter or estimator from, for example, the fusion function block (210). The strapdown navigation also requires initial estimates for the navigation solution (not shown).

One output of the strapdown navigation function block (206) is communicated to the measurement formulation function block (208). The measurement formulation function block (208) takes in inertial sensor data from the IMU 104 and navigation estimates from the strapdown navigation block (206) in order to compute an estimate of the gravitational anomaly. In one embodiment, the depth/altitude sensor (105) is also an input into the measurement formation block. The vertical accelerometer 204 of the IMU 104 may not be exactly vertical and the accelerometer 204 is measuring specific force, which contains the gravitational acceleration as well as effects from platform motion. The sensor data and navigation estimates are required to extract the gravitational anomaly from the total specific force. An output of the measurement formulation function block (208) is communicated to the fusion function block 210. Further in one embodiment at least one additional vertical accelerometer (such as accelerometer 103 of FIG. 1) is provided with the inertial sensor data to at least one of extend dynamic range and eliminate correlated errors.

The fusion function block (210) uses the navigation solution, the gravitational anomaly estimate, the gravity map information (gravitational anomaly as a function of position), and the measurement from the depth/altitude sensor(s) 106 (which is optional and may include a depth/altitude rate sensor) in producing an improved estimate of navigation and sensor errors that is used by the strapdown navigation function block (206). The navigation solution (output) contains information about the statistical uncertainty of the various parameters, and the map and sensors also have an associated uncertainty. The fusion function block (210) uses information about how errors grow with time, how errors grow with the current trajectory, current uncertainties of the various parameters, and the relationship between the gravity map 108 and the navigation solution to produce an estimate of navigation and sensor errors (as well as provide updated estimates of uncertainty). This information is passed back to the strapdown block function block (206) to improve the navigation solution and improve the estimates of navigation and sensor errors. The fusion function block (210) may employ any one or more of a fusion filter, an optimal filter and a matching algorithm in an embodiment in determining the navigation and sensor corrections signal. The optimal filter may be an extended Kalman filter and the fusion filter may be a fusion algorithm in different embodiments. Further, the matching algorithm may be a map matching algorithm. In an embodiment, the fusion function implemented involves a compromise between statistical optimality and computational complexity.

Figure 3:
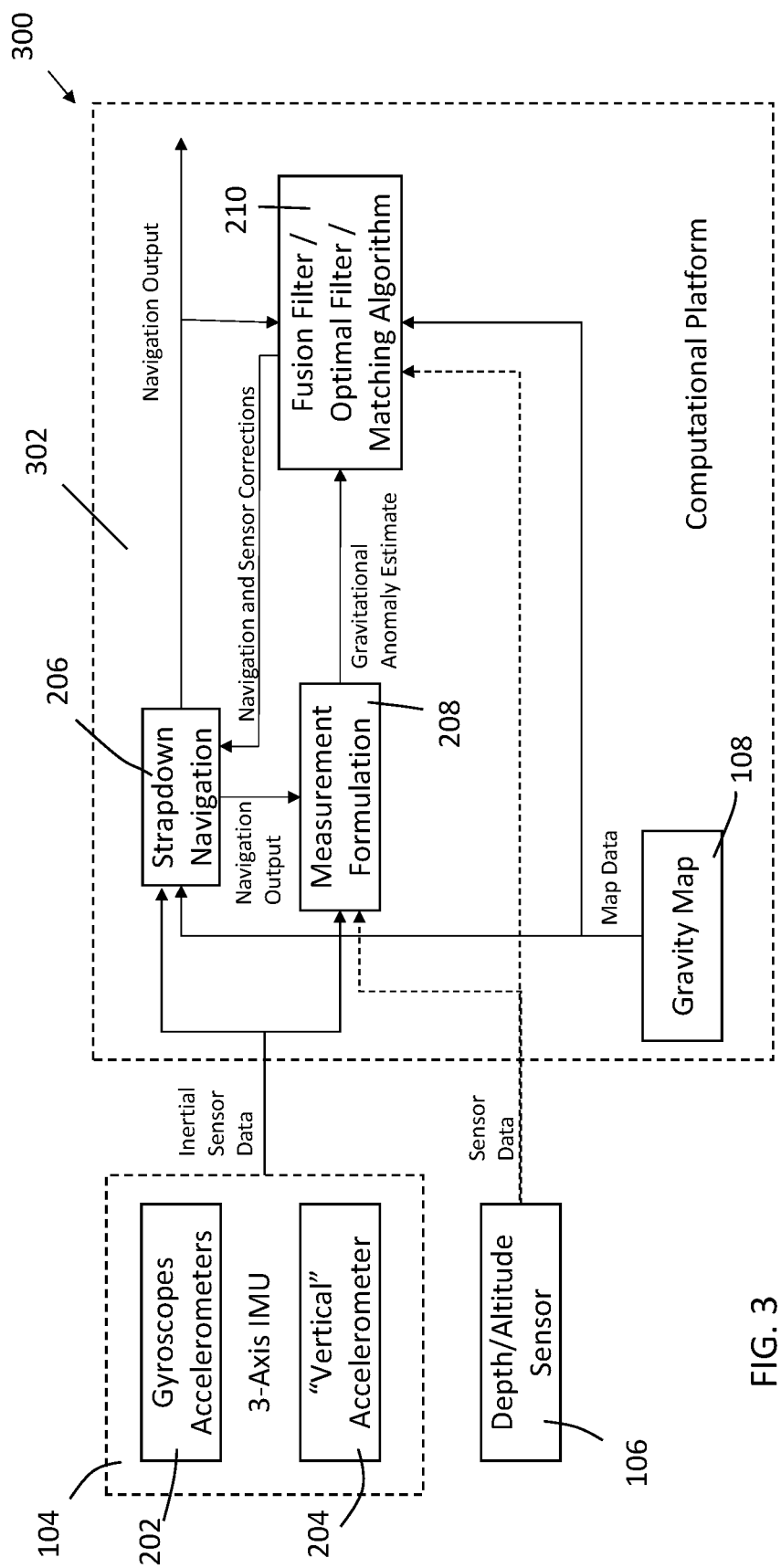
FIG. 3 is navigation data block diagram according to yet another exemplary embodiment In accordance with common practice, the various described features are not drawn to scale but are drawn to emphasize specific features relevant to the subject matter described. Reference characters denote like elements throughout Figures and text.

FIG. 3 illustrates another navigation data block diagram 300 of an example embodiment. This example embodiment illustrates that the gravity map 108, the strapdown navigation function block (206), the measurement formulation function block (208) and the fusion function block (210) are contained within a computation platform 302 in this example embodiment. For example, in reference with FIG. 1, the gravity map 108 may be stored within memory 106 and the function blocks 206, 208 and 210 may be stored as operating instructions 110 in the memory 106 which are executed by the controller 102. In the Example of FIG. 2, the function blocks (206), (208) and (210) may be performed in a multiple of different platforms (i.e. different controllers (processors) is different systems).

Embodiments provide navigation algorithms that incorporate map data from at least one gravity map, an integrated IMU and vertical accelerometer, an optional integrated additional height/depth aiding source and a setup system to pass all relevant data to the computation platform. Embodiments may be used to perform calibration routines at the beginning of a mission as desired as well as to maneuver the platform as desired and observe the navigation estimate.

EXAMPLE EMBODIMENTS

Example 1 includes an integrated inertial and gravitational anomaly navigation system. The system includes at least one inertial measurement unit (IMU), a gravity map, at least one memory, and at least one controller. The IMU includes an integrated gravimeter and is configured to output inertial sensor data. The gravity map includes gravitational forces that are associated with locations. The at least one memory is used to store operational instructions for at least functions. The at least one controller is in communication with an output of the at least one IMU and the at least one memory. The at least one controller is configured to execute the operating instructions stored in the at least one memory generating the functions. The functions including a strapdown navigation function, a measurement formation function and a fusion function. Wherein the strapdown navigation function generates a navigation output by the system based at least in part on the inertial sensor data, map data from the gravity map and navigation and sensor corrections from the fusion function. Further wherein the measurement formation function determines a gravitational anomaly estimate that is output to the fusion function based at least in part on the inertial sensor data and the navigation output. Further yet wherein the fusion function generates the navigation and sensor corrections due at least in part on inherent sensor errors that include vertical accelerometer/gravimeter errors from at least the navigation output, the gravitational anomaly estimate and the map data.

Example 2 includes the system of Example 1, wherein the integrated gravimeter is a vertical accelerometer of a sufficient quality to act as a gravimeter.

Example 3 includes the system of any of the Examples 1-2, further including a depth/altitude sensor that is configured to provide at least one of altitude and altitude derivative sensor data to the fusion function to at least one of aid the altitude and altitude derivative estimates.

Example 4 includes the system of any of the Examples 1-3, further including at least one supplemental vertical accelerometer used to at least one of extend dynamic range and eliminate correlated errors.

Example 5 includes the system of any of the Examples 1-4, wherein the gravity map further includes at least one of vector, scalar gravity information and gravity gradient information.

Example 6 includes the system of any of the Examples 1-5, wherein the gravitational anomaly estimate is also based in part on at least one of altitude and altitude rate sensor information that provides supplementary information about vertical acceleration to the measurement formulation function.

Example 7 includes the system of any of the Examples 1-6, wherein the at least one controller is a single controller.

Example 8 includes the system of any of the Examples 1-7, further including an input that is in communication with the at one controller to allow an operator to input operating instructions.

Example 9 includes the system of any of the Examples 1-8, further including an output in communication the at least one controller to output a navigation output determined by the at least one controller.

Example 10 includes the system of any of the Examples 1-9, wherein the output includes a vehicle control that is configured to control navigation of the vehicle at least in part on the navigation output determined by the at least one controller.

Example 11 includes the system of any of the Examples 1-10, wherein the fusion function is configured to implement at least one of a fusion filter, an optimal filter and a matching algorithm in generating the navigation and sensor corrections.

Example 12 includes a method for generating a navigation output. The method includes determining a gravitational anomaly estimate based at least in part on inertial sensor data and navigation output; generating navigation and sensor corrections that are due at least in part on inherent sensor errors that include vertical accelerometer/gravimeter errors from at least a navigation output estimate, the gravitational anomaly estimate, and the gravity map data; and generating the navigation output based on the inertial sensor data, gravity map data and the navigation and sensor corrections.

Example 13 includes the method of Example 12, wherein determining a gravitational anomaly estimate is further based on sensor data from a depth/altitude sensor.

Example 14 includes the method of any of the Examples 12-13, wherein generating the navigation and sensor corrections is further based on sensor data from a depth/altitude sensor.

Example 15 includes the method of any of the Examples 12-14, wherein the inertial sensor data is generated by at least one inertial measurement unit (IMU) that includes an integrated gravimeter.

Example 16 includes the method of any of the Examples 12-15, wherein the integrated gravimeter is a vertical accelerometer that is of a sufficient quality to act as a gravimeter.

Example 17 includes the method of any of the Examples 12-16, further including retrieving the gravity map data from a gravity map stored in memory.

Example 18 includes the method of any of the Examples 12-17, wherein generating navigation and sensor corrections further includes implementing at least one of a fusion filter, an optimal filter and a matching algorithm on data from at least the navigation output estimate, the gravitational anomaly estimate, and the gravity map data.

Example 19 includes a method for generating a navigation output. The method including determining a gravitational anomaly estimate based at least in part on inertial sensor data, altitude and altitude derivative estimate sensor data, and navigation output; generating navigation and sensor corrections that are due at least in part on inherent sensor errors that include vertical accelerometer/gravimeter errors from at least a navigation output estimate, the gravitational anomaly estimate, altitude and altitude derivative sensor data and the gravity map data; and generating the navigation output based on the inertial sensor data, the gravity map data and the navigation and sensor corrections.

Example 20 includes the method of claim 19, further including using a vertical accelerometer to at least one of extend dynamic range and eliminate correlated errors.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. An integrated inertial and gravitational anomaly navigation system, the system comprising:
    at least one inertial measurement unit (IMU) including an integrated gravimeter, the IMU configured to output inertial sensor data;
    a gravity map including gravitational forces associated with locations;
    at least one memory to store operational instructions for at least functions; and
    at least one controller in communication with an output of the at least one IMU and the at least one memory, the at least one controller configured to execute the operating instructions stored in the at least one memory generating the functions, the functions including a strapdown navigation function, a measurement formation function and a fusion function, wherein the strapdown navigation function generates a navigation output by the system based at least in part on the inertial sensor data, map data from the gravity map and navigation and sensor corrections from the fusion function, further wherein the measurement formation function determines a gravitational anomaly estimate that is output to the fusion function based at least in part on the inertial sensor data and the navigation output, further yet wherein the fusion function generates the navigation and sensor corrections due at least in part on inherent sensor errors that include vertical accelerometer/gravimeter errors from at least the navigation output, the gravitational anomaly estimate and the map data.

2. The system of claim 1, wherein the integrated gravimeter is a vertical accelerometer of a sufficient quality to act as a gravimeter.

3. The system of claim 1, further comprising:
    a depth/altitude sensor configured to provide at least one of altitude and altitude derivative sensor data to the fusion function to at least one of aid the altitude and altitude derivative estimates.

4. The system of claim 1, further comprising:
    at least one supplemental vertical accelerometer to at least one of extend dynamic range and eliminate correlated errors.

5. The system of claim 1, wherein the gravity map further includes at least one of vector, scalar gravity information and gravity gradient information.

6. The system of claim 1, wherein the gravitational anomaly estimate is also based in part on at least one of altitude and altitude rate sensor information that provides supplementary information about vertical acceleration to the measurement formulation function.

7. The system of claim 1, wherein the at least one controller is a single controller.

8. The system of claim 1, further comprising:
an input in communication with the at one controller to allow an operator to input operating instructions.

9. The system of claim 1, further comprising:
an output in communication the at least one controller to output a navigation output determined by the at least one controller.

10. The system of claim 9, wherein the output includes a vehicle control that is configured to control navigation of the vehicle at least in part on the navigation output determined by the at least one controller.

11. The system of claim 1, wherein the fusion function is configured to implement at least one of a fusion filter, an optimal filter and a matching algorithm in generating the navigation and sensor corrections.

12. A method for generating a navigation output, the method comprising:
determining a gravitational anomaly estimate based at least in part on inertial sensor data and navigation output;
generating navigation and sensor corrections that are due at least in part on inherent sensor errors that include vertical accelerometer/gravimeter errors from at least a navigation output estimate, the gravitational anomaly estimate, and gravity map data; and
generating the navigation output based on the inertial sensor data, the gravity map data and the navigation and sensor corrections.

13. The method of claim 12, wherein determining a gravitational anomaly estimate is further based on sensor data from a depth/altitude sensor.

14. The method of claim 12, wherein generating the navigation and sensor corrections is further based on sensor data from a depth/altitude sensor.

15. The method of claim 12, wherein the inertial sensor data is generated by at least one inertial measurement unit (IMU) that includes an integrated gravimeter.

16. The method of claim 15, wherein the integrated gravimeter is a vertical accelerometer that is of a sufficient quality to act as a gravimeter.

17. The method of claim 12, further comprising:
retrieving the gravity map data from a gravity map stored in memory.

18. The method of claim 12, wherein generating navigation and sensor corrections further comprises:
implementing at least one of a fusion filter, an optimal filter and a matching algorithm on data from at least the navigation output estimate, the gravitational anomaly estimate, and the gravity map data.

19. A method for generating a navigation output, the method comprising:
determining a gravitational anomaly estimate based at least in part on inertial sensor data, altitude and altitude derivative estimate sensor data, and navigation output;
generating navigation and sensor corrections that are due at least in part on inherent sensor errors that include vertical accelerometer/gravimeter errors from at least a navigation output estimate, the gravitational anomaly estimate, altitude and altitude derivative sensor data and the gravity map data; and
generating the navigation output based on the inertial sensor data, the gravity map data and the navigation and sensor corrections.

20. The method of claim 19, further comprising:
using a vertical accelerometer to at least one of extend dynamic range and eliminate correlated errors.

* * * * *